United States Patent
Hill et al.

(10) Patent No.: US 9,435,566 B2
(45) Date of Patent: Sep. 6, 2016

(54) METHOD AND APPARATUS FOR DETECTING AND COMPENSATING FOR SEDIMENT BUILD-UP IN TANK-STYLE WATER HEATERS

(75) Inventors: Bruce L. Hill, Roseville, MN (US); Lubomir Dobsik, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 429 days.

(21) Appl. No.: 13/604,469

(22) Filed: Sep. 5, 2012

(65) Prior Publication Data

US 2014/0060457 A1    Mar. 6, 2014

(51) Int. Cl.
| | |
|---|---|
| *F24H 9/20* | (2006.01) |
| *F24H 1/18* | (2006.01) |
| *G05D 23/19* | (2006.01) |
| *C02F 1/00* | (2006.01) |
| *F24H 9/00* | (2006.01) |
| *F24D 19/00* | (2006.01) |

(52) U.S. Cl.
CPC ............. *F24H 9/2035* (2013.01); *C02F 1/008* (2013.01); *F24D 19/0092* (2013.01); *F24H 1/185* (2013.01); *F24H 1/186* (2013.01); *F24H 9/0042* (2013.01); *F24H 9/2021* (2013.01); *G05D 23/19* (2013.01); *C02F 2209/001* (2013.01); *C02F 2209/02* (2013.01); *C02F 2303/22* (2013.01); *C02F 2307/12* (2013.01); *F24H 2250/02* (2013.01)

(58) Field of Classification Search
CPC ................................ F24H 9/20; F24H 9/2021
USPC ............. 122/14.1, 14.22; 392/311, 312, 316, 392/318, 325, 327, 331, 338; 219/481
See application file for complete search history.

(56) References Cited

U.S. PATENT DOCUMENTS

| | | |
|---|---|---|
| 3,948,439 A | 4/1976 | Heeger |
| 4,638,789 A | 1/1987 | Ueki et al. |
| 5,125,068 A | 6/1992 | Mcnair et al. |
| 6,053,130 A | 4/2000 | Shellenberger |
| 6,236,321 B1 * | 5/2001 | Troost, IV .............. 340/588 |
| 6,390,029 B2 | 5/2002 | Alphs |
| 6,606,968 B2 | 8/2003 | Iwamam et al. |
| 6,701,874 B1 | 3/2004 | Schultz et al. |

(Continued)

FOREIGN PATENT DOCUMENTS

| | | |
|---|---|---|
| FR | 2820206 | 8/2008 |
| JP | 2006084322 | 3/2006 |
| WO | EP 1178748 | 2/2002 |

OTHER PUBLICATIONS

Industrial Controls, Basics of PID Control, 2009, 1-4.*

(Continued)

*Primary Examiner* — Steven B McAllister
*Assistant Examiner* — Steven Anderson, II
(74) *Attorney, Agent, or Firm* — Seager, Tufte & Wickhem LLP

(57) ABSTRACT

A method for detecting and compensating for sediment build-up in a tank style water heater is disclosed. An illustrative but non-limiting example may include monitoring a temperature of water within a water storage tank of a water heater over time, resulting in a monitored temperature profile. The method may then include determining if the monitored temperature profile includes one or more features that indicate sediment build up in the water storage tank, and if so, provide an output that indicates sediment build up is present.

12 Claims, 5 Drawing Sheets

(56) References Cited

U.S. PATENT DOCUMENTS

| | | |
|---|---|---|
| 6,880,493 B2 | 4/2005 | Clifford et al. |
| 7,032,542 B2 | 4/2006 | Donnelly et al. |
| 7,167,813 B2 | 1/2007 | Chian et al. |
| 7,434,544 B2 | 10/2008 | Donnelly et al. |
| 7,623,771 B2 | 11/2009 | Lentz et al. |
| 2006/0173653 A1* | 8/2006 | Chian et al. ........... 702/182 |
| 2007/0227467 A1 | 10/2007 | Gordon et al. |
| 2007/0295286 A1* | 12/2007 | Donnelly et al. ........ 122/14.1 |
| 2009/0120380 A1 | 5/2009 | Chian et al. |

OTHER PUBLICATIONS

Process Technology, Troubleshooting Electric Immersion Heaters, Mar. 22, 2010, http://www.processtechnology.com/troubleshootheaters.html.*

* cited by examiner

METHOD AND APPARATUS FOR DETECTING AND COMPENSATING FOR SEDIMENT BUILD-UP IN TANK-STYLE WATER HEATERS

TECHNICAL FIELD

The disclosure is directed to methods and systems for controlling a water heater, and more particularly to detecting and compensating for sediment build-up in a tank-style water heater.

BACKGROUND

Water heaters are used in homes, businesses and just about any establishment having the need for heated water. A conventional tank-style water heater has a water heater tank, and at least one heating element or "heater" for heating the water in the water heater tank. The heater is often a gas-fired burner and/or electric heating element. A water heater typically also includes a thermostat or controller for controlling the heater. The controller typically receives signals related to the temperature of the water within the water heater tank, often from a temperature sensor or the like that is thermally engaged with the water in the water heater tank.

In some instances, the water heater may operate in accordance with a first temperature set point and a second temperature set point. The difference between the first and second temperature set point is often referred to as the temperature differential of the water heater. When temperature signals from the temperature sensor indicate that the water temperature is below the second set point, for example when the water temperature is below about 120° F., the controller may turn on the heater and the water within the water heater tank begins to heat. After some time, the water temperature within the water heater tank will increase to the first set point, which, for example may be about 140° F. At this point, the controller may cause the heater to reduce its heat output or, alternatively, causes the heater to turn off. This heat cycle begins again when the water temperature within the water heater tank cools down below the second set point.

For a gas fired water heater, a temperature sensor, a gas valve and a controller are often mounted to the water heater tank. The controller typically receives a temperature signal from the temperature sensor. In some cases, the temperature sensor may protrude into and thermally engage the water in the water heater tank. The controller typically is programmed to control the gas valve such that the temperature of the water in the water heater tank remains between the first and second temperature set points, as described above. For an electric water heater, a temperature sensor, a power delivery unit and a controller may be mounted to the water heater tank. In this case, the controller may control the power delivery unit such that the temperature of the water in the water heater tank is kept between the first and second temperature set points.

In some instances, sediment may build-up in tank-style water heaters at a rate determined by the quality of the water. Sediment build-up often creates a mineral rich slurry at the bottom of the tank. This slurry typically has a high heat capacity and is heavier than water. When the burner is running, this sediment can absorb a great deal of heat from the heat exchanger as the heat is passed from the tank metal to the water. In many cases, end-users are asked to periodically drain their tank to remove this sediment build-up in order to prevent damage to the water heater and/or increase efficiency of the water heater. In some cases, failure to remove excessive sediment can result in over-heated metal and damage to the glass lining of the water storage tank, which can reduce the life of the tank. What would be desirable is a mechanism for detecting the build-up of sediment so that end-users can be notified when sediment build-up has occurred. Alternatively, or in addition, it would be desirable to compensate the operation of the water heater to account for sediment build-up.

SUMMARY

The present disclosure relates generally to tank-style water heaters, and more particularly, to a methods and systems for detecting and compensating for sediment build-up in tank style water heaters. An illustrative, but non-limiting example of the disclosure may be found in a method for detecting and compensating for sediment build-up in a tank style water heater. The tank-style water heater may include a water storage tank, a temperature sensor, a heating element, and a controller. The controller may monitor the temperature of the water within the tank using the temperature sensor, resulting in a monitored temperature profile. During normal operation, the controller may activate the heating element of the water heater when the temperature of the water in the water storage tank falls below a second predetermined temperature value, and deactivate the heating element when the temperature of the water in the water storage tank rises above a first predetermined temperature value. In some cases, the controller may also determine if the monitored temperature profile includes one or more features that indicate a sediment build up in the water storage tank, and if so, provide an output that indicates sediment build up is present. The one or more features may include, for example, a temperature overshoot feature that represents a temperature overshoot by at least an overshoot threshold amount over the first predetermined temperature value after the heating element is deactivated, a transient temperature spike that has a magnitude that is greater than a threshold magnitude occurring while the heating element is activated or after the heating element is deactivated, and/or any other suitable feature that is indicative of sediment build up in the water storage tank. In some cases, the controller may reduce the first predetermined temperature value if sediment build up is detected to help mitigate damage to the water heater.

The above summary is not intended to describe each disclosed embodiment or every implementation of the disclosure.

BRIEF DESCRIPTION OF THE DRAWINGS

The disclosure may be more completely understood in consideration of the following description of various illustrative embodiments in connection with the accompanying drawings, in which.

Figure 1:
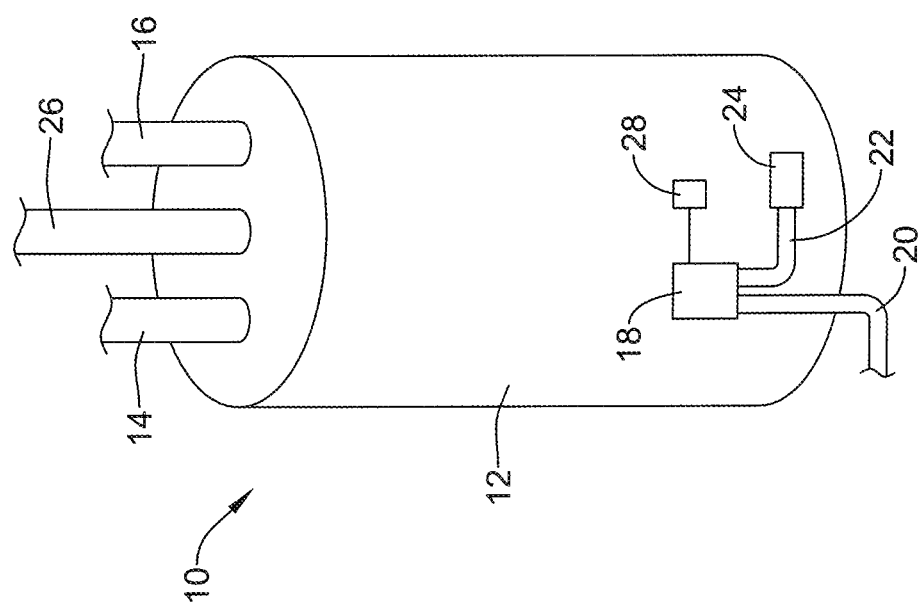
FIG. 1 is a schematic view of an illustrative but non-limiting tank-style water heater in accordance with the present disclosure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected illustrative embodiments and are meant to be illustrative in nature and not intended to limit the scope of the disclosure. Although examples of construction, dimensions, and materials are illustrated for the various elements, those skilled in the art will recognize that many of the examples provided have suitable alternatives that may be utilized. Also, it is contemplated that selected features of any illustrative embodiment may be incorporated into an additional embodiment unless clearly stated to the contrary.

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure. Also, although some suitable dimensions ranges and/or values pertaining to various components, features and/or specifications are disclosed, one of skill in the art, incited by the present disclosure, would understand desired dimensions, ranges and/or values may deviate from those expressly disclosed.

FIG. 1 provides a schematic view of an illustrative but non-limiting tank-style water heater 10. While water heaters are described below as one example application of the present disclosure, it should be recognized that there are many other applications where it may be desirable to detect and compensate for sediment build-up inside of an enclosed tank.

The illustrative tank-style water heater 10 includes a water heater tank 12. The water heater tank 12 may include an insulating layer (not explicitly shown) positioned about the water heater tank 12 to help reduce thermal losses from the water heater tank 12. In the illustrative embodiment, cold water enters water heater tank 12 through a cold water line 14 and is heated by a gas burner 24. In some cases, the water heater 10 may include an electric heating element rather than a gas burner 24. A power delivery unit (not shown) may be used to selectively apply power (i.e. current) to the electric heating element. In either case, the resulting heated water exits through a hot water line 16. For gas-fired water heaters, a control unit 18, which may include a gas valve, may regulate gas flow from a gas source 20 through a combustion gas line 22 and into gas burner 24. A flue 26 may permit combustion byproducts to safely exit.

The illustrative water heater 10 also includes a temperature sensor 28. In some cases, temperature sensor 28 may enter water heater tank 12 at a location laterally offset from control unit 18. In some instances, however, temperature sensor 28 may be located behind control unit 18, and in some cases, may be supported and retained by a common mounting bracket. In some embodiments, a non-immersion type temperature sensor may be provided. While not explicitly shown, the water heater tank 12 may include a threaded spud or other feature(s) for mounting an immersion or non-immersion type temperature sensor 28 relative to the water heater tank 12.

In some instances, sediment from the water entering the cold water line 14 may accumulate within the water heater tank 12. The sediment may have a high heat capacity and may be heavier than water, causing the sediment to build up in the bottom of the tank 12. When the burner 24 is operating, the sediment may absorb a substantial amount of heat as the heat passed into the water tank. This may result in the sediment becoming "superheated". In some instances, the superheated sediment may produce transient spikes of heat in the water during a normal heat-up temperature profile, as intermittent jets of superheated water may escape through the sediment and rise up past the temperature sensor 28. In some cases, the superheated sediment may cause the water temperature within the tank 12 to over-shoot the set-point temperature by continuing to heat the water in the water tank 12 after the burner 24 has been turned off by the control unit 18. It may be desirable to detect either one or both of these conditions, or other conditions that indicate sediment in the water tank 12, to allow the control unit 18 to compensate for such sediment. In some cases, if sediment is detected, the control unit 18 may reduce the burner time to reduce set-point over-shoot. Alternatively, or in addition, the control unit 18 may adjust (e.g. reduce) the set-point temperature until the sediment is removed. Alternative, or in addition, the control unit 18 may detect transient temperature spikes relative to a normal heat-up temperature profile in the tank 12. If the transient temperature spikes have a magnitude (amplitude, duration or combination thereof) exceed a predetermined threshold magnitude value, sediment build-up may be detected and the set-point temperature may be adjusted (e.g. reduced) to compensate. In some instances, the control unit 18 may alert a user to the sediment build-up, such that the user can drain the tank 12 and remove the sediment build up in a timely manner.

Figure 2:
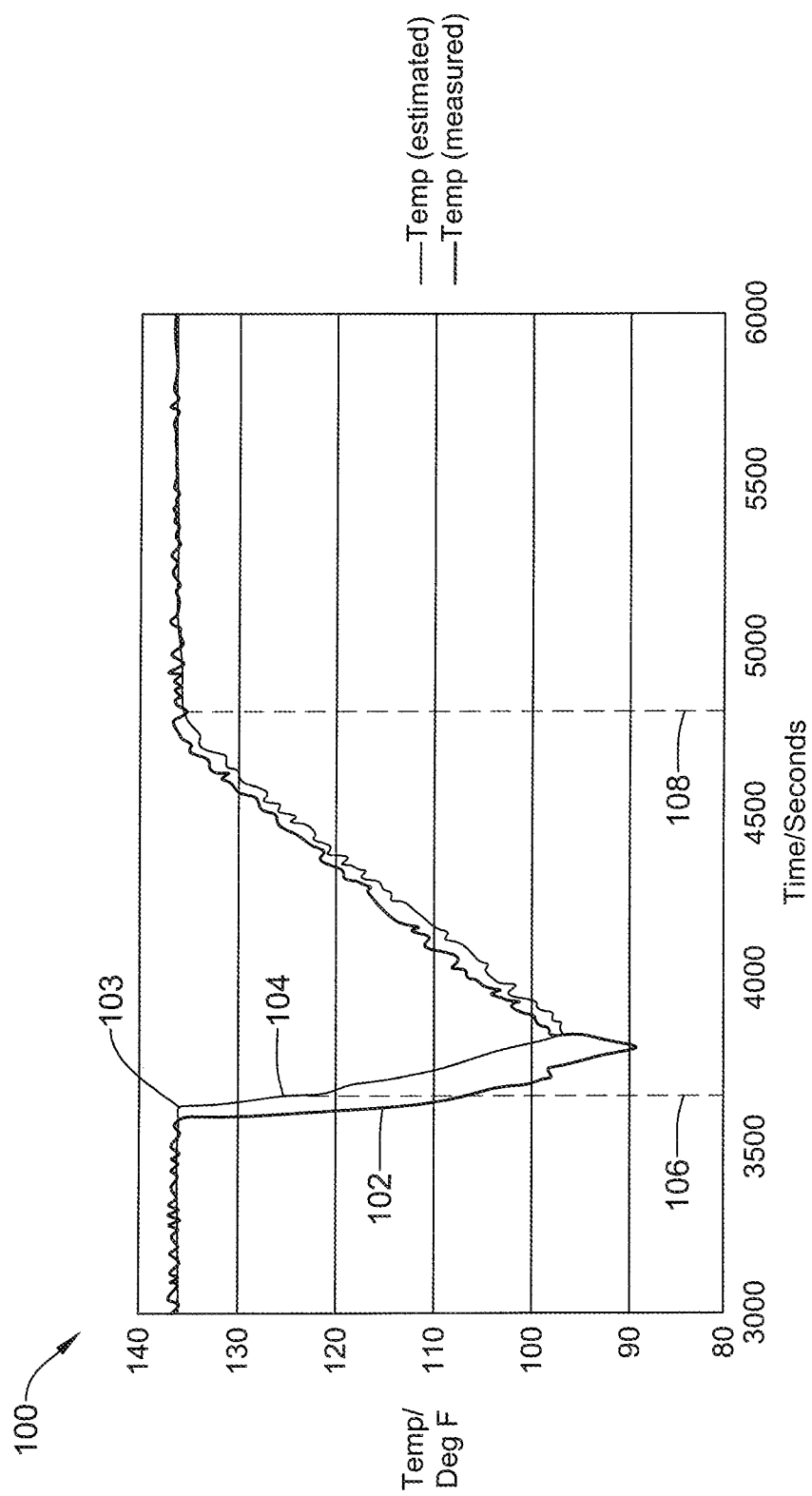
FIG. 2 is an illustrative normal heating profile for a clean tank.

FIG. 2 illustrates an illustrative water heater temperature profile 100 for a clean water storage tank 12 (e.g. minimal sediment buildup). The water heater temperature profile may be a result of monitoring the temperature of the water within the water storage tank over time. It is contemplated that the temperature of the water within the water storage tank may be monitored continuously, at a predetermined interval (e.g. every 1 second, 5 seconds, 1 minute, or any other suitable interval), or at any other suitable times. In FIG. 2, the temperature of the water is shown within the tank over a non-specific range of time.

Curve 102 represents the measured water temperature of the tank near the bottom of the tank (such as, but not limited to, tank 12), while curve 104 represents an estimated or expected water temperature based on a clean tank. As can be seen, the measured temperature curve 102 closely follows the estimated water temperature curve 104. At a given time, such as time 103, hot water may be removed from the water tank via hot water line 16. When hot water is removed, the hot water is replaced with cold water from cold water line 14, which causes the temperature of the water in the tank 12 to drop from the set-point temperature (e.g. 135 degrees). Once the water temperature drops to a predetermined temperature (e.g. a second predetermined temperature value, such as 125 degrees), the water heater burner element (such as, but not limited to, gas burner 24) is activated, such as at time 106. The water temperature may continue to drop if the rate at which hot water is removed from the tank exceeds the rate at which the burner can heat the cold water entering the tank. As the burner heats the water in the tank, the water temperature within the tank 12 may begin to rise. The burner may remain activated until a predetermined temperature is reached (e.g. a first predetermined temperature value or set-point, such as 135 degrees), at which the burner may be turned off, as shown at 108 in FIG. 2. It is contemplated that after the burner is turned off at 108, the burner may emit some residual heat that continues to heat the water. The heating rate (change in temperature over time) of the water after the burner is turned off is typically equal to or less than the heating rate of the water while the burner was on. As a result of the residual heat, the measured water temperature 102 may slightly over-shoot the first predetermined temperature value or set-point as residual heat may continue to heat the water adjacent the burner. However, when the tank is clean (e.g. minimal sediment buildup), the set-point over-shoot may be relatively small, and less than a predetermined overshoot threshold value.

Figure 3:
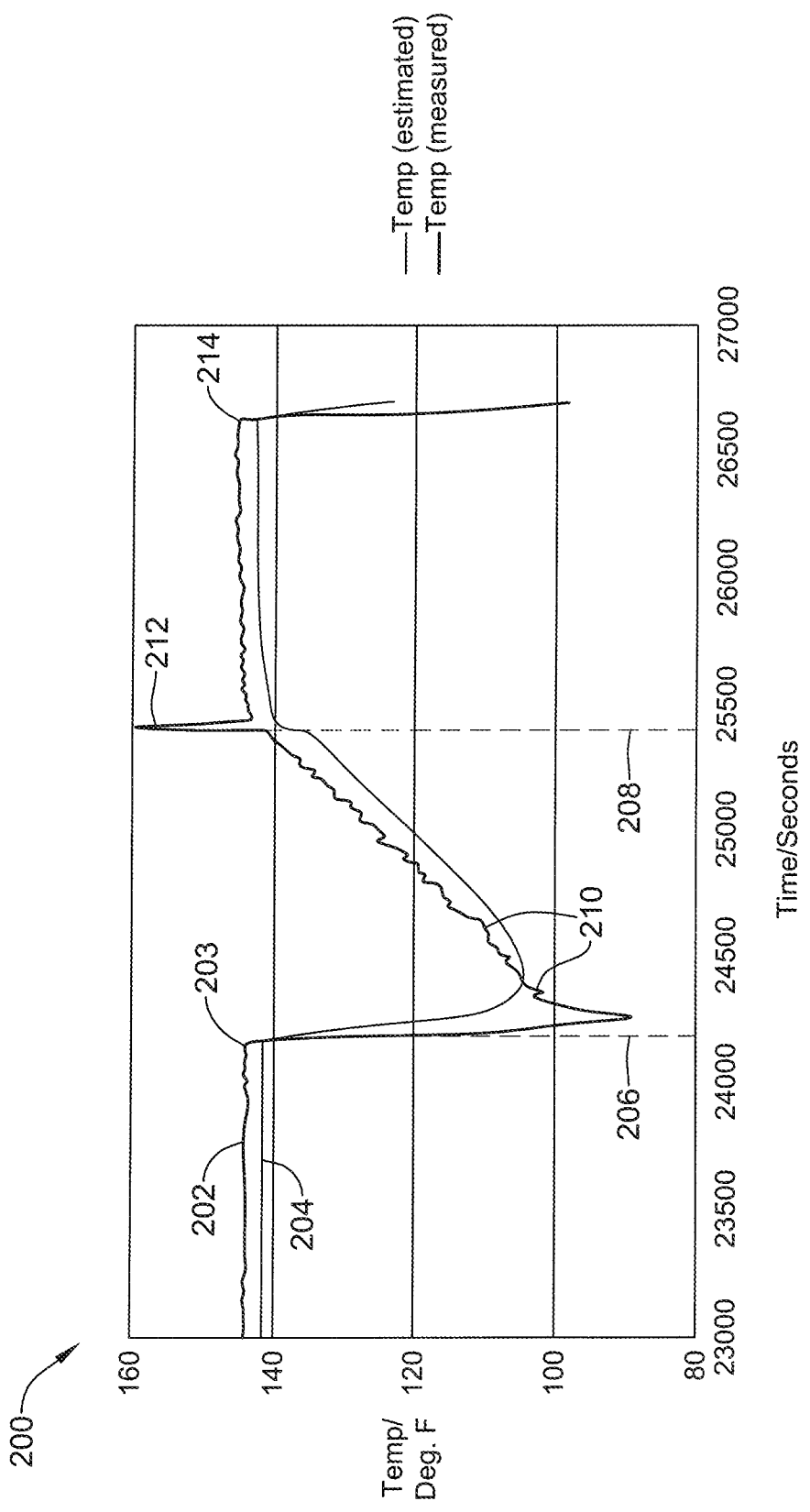
FIG. 3 is an illustrative water heater temperature profile for a tank containing sediment.

FIG. 3 illustrates an illustrative water heater temperature profile 200 for a water tank having sediment build-up. The water heater temperature profile shows the temperature of the water within the tank over a non-specific range of time. In the illustrative graph, curve 202 represents the measured water temperature near the bottom of the tank (such as, but not limited to, tank 12), while curve 204 represents an estimated or expected water temperature heating profile for a clean tank. At any given time, such as at time 203, water may be removed from the water tank and subsequently the temperature of the water may begin to drop from the first predetermined temperature value or set-point as the tank is replenished with cold water. Once the water temperature drops to the second predetermined temperature value, the water heater burner element (such as, but not limited to, gas burner 24) may be activated, such as is shown at time 206. The water temperature may continue to drop if the rate at which hot water is removed from the tank exceeds the rate at which the burner can heat the cold water entering the tank. As the burner heats the water in the tank, the water temperature within the storage tank may begin to rise. The burner may remain activated until the first predetermined temperature value or set-point is reached, at which at time 208 in FIG. 3, the burner may be turned off by the control unit. The process may be repeated each time hot water is removed from the tank, such as at time 214.

As discussed above, sediment build-up may create a mineral-rich slurry in the bottom of the tank. This slurry may have a high heat capacity and may be heavier than water such that the slurry settles at the bottom of the tank. When the burner is running, this sediment may absorb and retain a relatively large amount of heat as the heat is passed into the water tank. The sediment may release the heat, which may cause a set-point over-shoot and/or a rapid temperature rise in the water. In some cases, the heating rate (change in temperature over time) of the water after the burner is turned off may be equal to or even greater than the heating rate of the water while the burner was on. The heating rate after the burner is turned off may be greater than when the burner was on due to a release of heat from the sediment build-up. At any rate, as a result of the residual heat and/or heat released by the sediment, the measured water temperature 202 may over-shoot 212 the first predetermined temperature value or set-point as heat is continued to be transferred to the water in the water tank. It is contemplated that, in some instances, the water temperature may surpass the first predetermined temperature value or set-point by a predetermined overshoot threshold amount (e.g. 3° F., 5° F., 7° F., 10° F., 20° F. or more) when significant sediment build-up is present. However, when the tank is clean (e.g. minimal sediment buildup), the set-point over-shoot may be less than the predetermined overshoot threshold amount.

In some instances, the sediment may cause the heating profile 202 to have regions, such as, but not limited to regions 210, that are less linear than may be expected for a clean tank. This may be due, in part, to uneven heat distribution attributed to the sediment build-up. It is contemplated that, in some instances, the sediment may trap super-heated water. As super-heated water escapes through the sediment, rapid heat rise or transient temperature spikes in the water temperature may occur. The rapid heat rise may occur during the normal heat-up time (see transient spike 330 in FIG. 4), or as over-shoot of the set-point temperature as illustrated by transient spike 212. Detecting transient spikes in the temperature profile and/or rapid heating of the water after the burner is turned off, or both of these conditions, may allow the controller to reduce burner time and/or adjust the set-point (to reduce set-point over-shoot) and/or annunciate the sediment build-up so users can drain the tank and remove the sediment build up in a timely manner.

Figure 4:
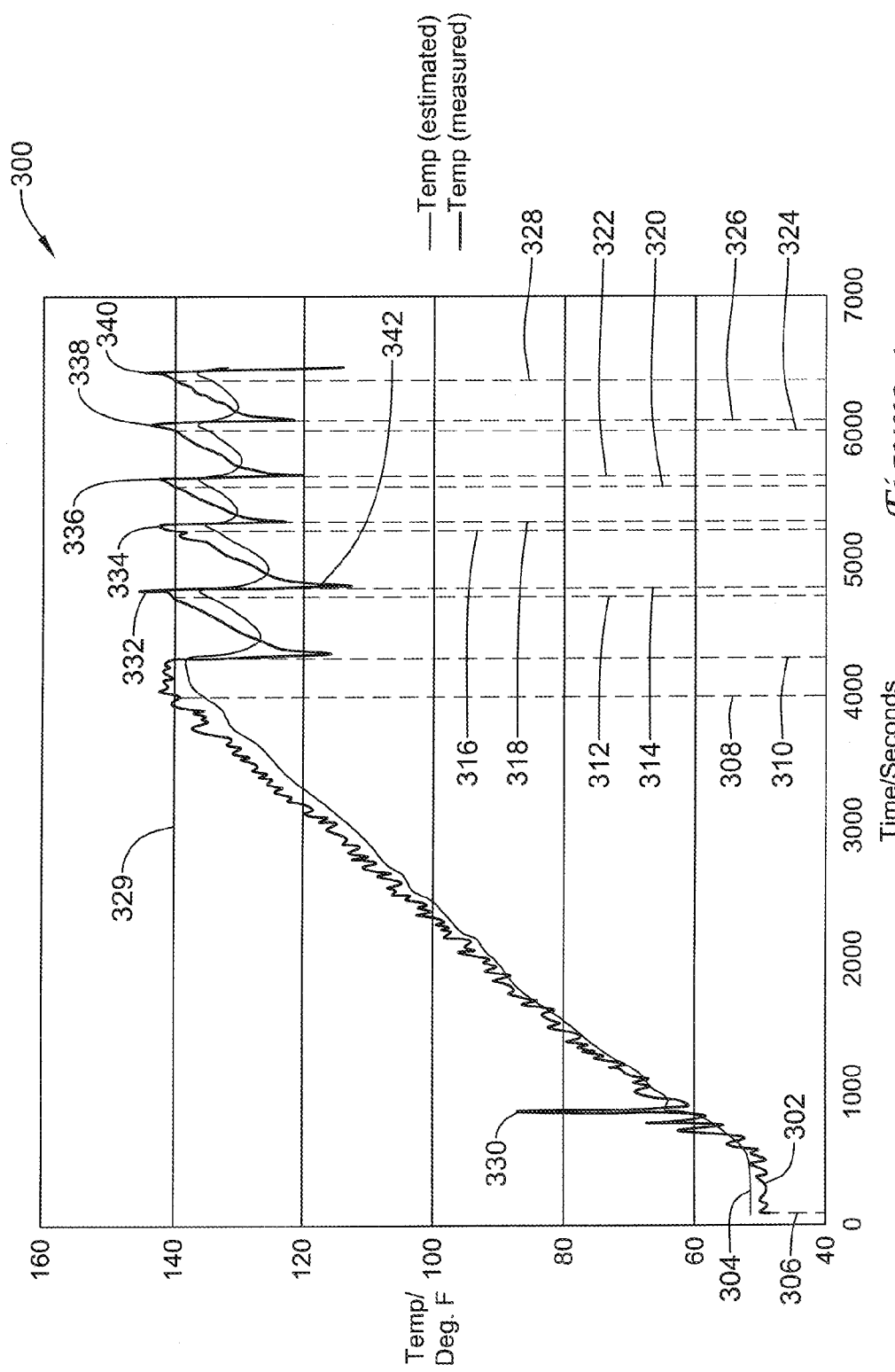
FIG. 4 is another illustrative water heater temperature profile for a tank containing sediment.

FIG. 4 illustrates another illustrative water heater temperature profile 300 for a water tank having sediment build-up. The illustrative water heating profile 300 shows the temperature of the water within the tank over a non-specific range of time. In FIG. 4, curve 302 represents the measured or sensed water temperature adjacent to the bottom of the tank (such as, but not limited to, tank 12), while curve 304 represents an estimated or expected water temperature heater profile for a clean tank. In the illustrative water heater temperature profile 300, the water in the tank starts relatively cold and may require a substantial amount of heat to obtain the first predetermined temperature value or set-point, such as 140 degrees. The burner (such as, but not limited to, gas burner 24) may be activated at time 306 to begin the heating process. As time passes and heat is transferred to the water in the tank, the water temperature may begin to rise as shown. In some instances, the sediment may trap super-heated water near the bottom of the tank. As super-heated water escapes through the sediment, rapid heat rise or transient spikes in the water temperature may be sensed by the temperature sensor, such as the transient temperature spike shown at 330. Once the first predetermined temperature value or set-point is reached, the burner may be turned off, which in FIG. 4, occurs at time 308.

At any given time, water may be removed from the water tank and subsequently, the temperature of the water may begin to drop from the first predetermined temperature value or set-point as the tank is replenished with cold water. Once the water temperature drops to a second predetermined temperature value, the controller may activate the water heater burner, such as shown at time 310. Once the first predetermined temperature value or set-point is again reached, the burner may be turned off, which in the example shown, occurs at time 312. The process may be repeated each time sufficient hot water is removed from tank. A series of short water draws may cause the burner to cycle on (such as at times 314, 318, 322, 326) as the water temperature cools due to incoming cold water and off (such as at times 316, 320, 324, 328) as the water reaches the first predetermined temperature value or set-point. It is contemplated that the water temperature within the tank may continue to drop even after the burner element is activated if the rate at which hot water is removed from the tank exceeds the rate at which the burner can heat the cold water entering the tank.

As discussed above, sediment build-up may create a mineral-rich slurry in the bottom of the tank. This slurry may have a relatively high heat capacity and may be heavier than water such that the slurry settles at the bottom of the tank. When the burner is running, this sediment may absorb a great deal of heat from the heat exchanger as the heat is passed into the water tank. The sediment may release heat into the water in the tank during and after the burner is turned off, which may help contribute to a set-point overshoot and/or rapid rise of the water temperature in the tank. This is illustrated in FIG. 4, as the temperature within the water tank repeatedly surpasses the first predetermined temperature value or set-point 329 as the burner element is cycled off, as shown at 332, 334, 336, 338, and 340. It is contemplated that, in some instances, the water temperature may surpass the first predetermined temperature value or set-point 329 by a predetermined overshoot threshold (e.g. 3° F., 5° F., 7° F., 10° F., 20° F. or more) when significant sediment build-up is present. However, when the tank is clean (e.g. minimal sediment buildup), the set-point overshoot may be less than the predetermined overshoot threshold.

It is contemplated that, in some instances, the sediment build up may trap super-heated water. As super-heated water escapes through the sediment, rapid heat rise, such as illustrated at 342, or other transient spikes 330 in the sensed water temperature may occur. The rapid heat rise may occur during the normal heat-up time 342, and/or as an over-shoot of the first predetermined temperature value or set-point 329 as illustrated at points 332, 334, 336, 338, 340. Detecting such transient spikes, relative to a normal temperature warm-up profile, and/or detecting significant heating of the water after the burner is turned off (e.g. an over-shoot of greater than a predetermined overshoot threshold) may indicate sediment build up in the water tank, and in response, a water heater controller may reduce burner time (to reduce set-point over-shoot), modify the set-point temperature, annunciate sediment build-up to a user, and/or perform other suitable actions.

More generally, it is contemplated that a controller may monitor the temperature of the water within the tank using a temperature sensor, resulting in a monitored temperature profile. In some cases, the controller may determine if the monitored temperature profile includes one or more features that indicate a sediment build up in the water storage tank. The one or more features may include, for example: a temperature overshoot feature that represents a temperature overshoot by at least an overshoot threshold amount over the first predetermined temperature value after the heating element is deactivated by the controller; a transient temperature spike that has a magnitude that is greater than a threshold magnitude, occurring while the heating element is activated by the controller or after the heating element is deactivated by the controller; one or more regions that are less linear relative to what is expected for a clean tank; a change in heating rate (change in temperature over time) relative to what is expected for a clean tank, or any other suitable feature that may be indicative of sediment build-up in the water tank. In some cases, the controller may reduce the first predetermined temperature value if it is determined that the temperature profile includes one or more features that indicate sediment build up in the water tank.

Figure 5:
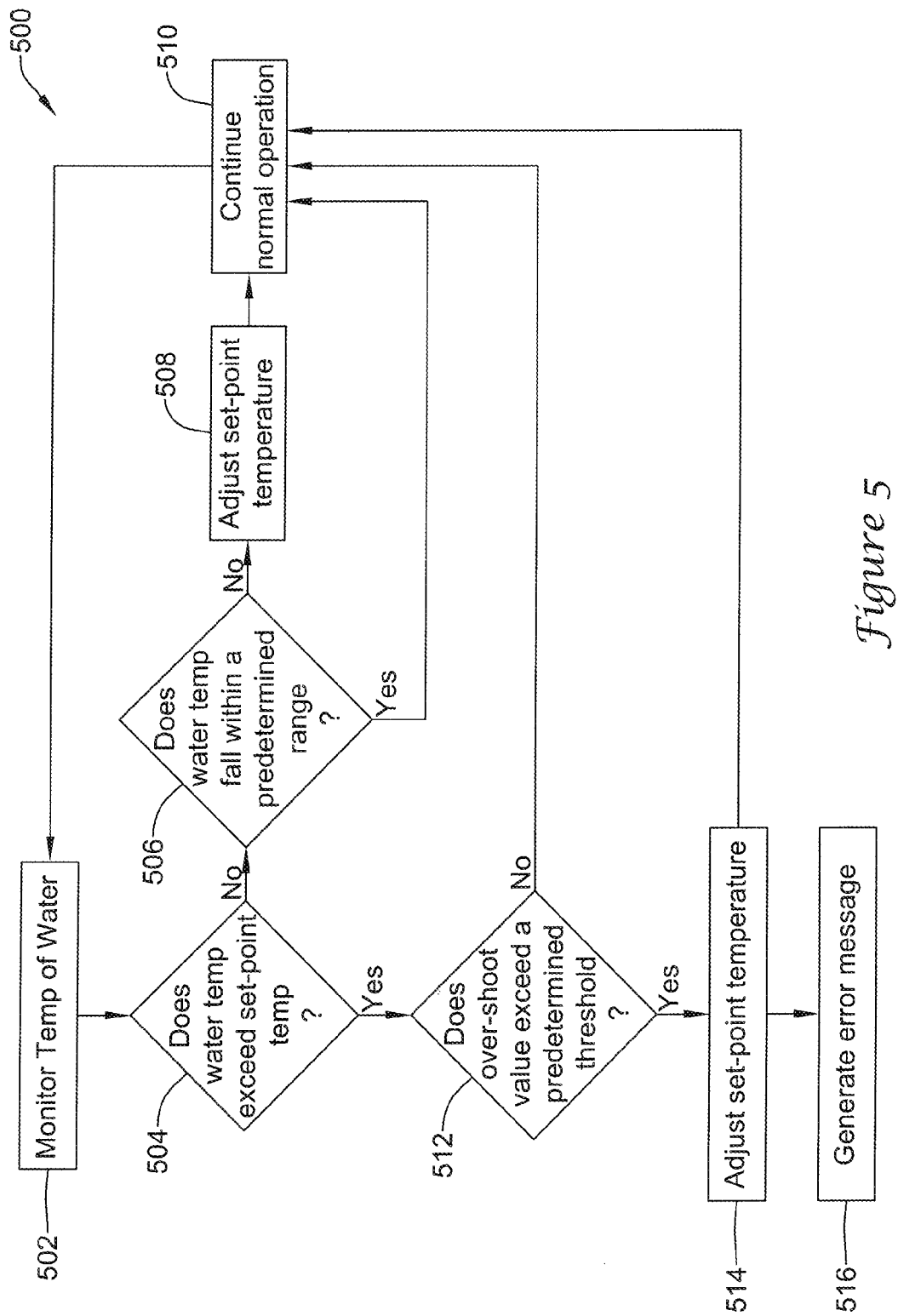
FIG. 5 is an illustrative method for detecting sediment build-up in a tank.

FIG. 5 is a flow chart demonstrating an illustrative method 500 for detecting and compensating for sediment build-up in a water storage tank. During routine operation, the measured water temperature may be monitored and compared to a first predetermined temperature value (or set-point temperature), as shown at 502. In some instances, the measured temperature may be continuously monitored while in other instances, the measured temperature may be monitored at predetermined intervals, or at any other suitable times. In addition to monitoring the water temperature during normal tank operation, the measured temperature may be monitored to determine if sediment build-up is present. In some instances, the controller may be configured to compare the measured temperature to the first predetermined temperature value (or set-point temperature) after the burner has been turned off to determine if the sensed water temperature exceeds the first predetermined temperature value (or set-point temperature), as shown at 504. It is contemplated that the controller may be configured to compare the water temperature and the first predetermined temperature value (or set-point temperature) at a predetermined time interval after the burner has been turned off. For example, and in some cases, the controller may perform the comparison 10 seconds, 30 seconds, 1 minute, 5 minutes, 10 minutes or any time interval after the burner has been turned off.

If the actual (measured) water temperature does not exceed the first predetermined temperature value (or set-point temperature), the controller may determine if the water temperature falls within a predetermined range 506 of the first predetermined temperature value (or set-point temperature). If the water temperature falls within a predetermined range of the first predetermined temperature value (or set-point temperature), the controller may continue normal operation 510 of the water heater. In some instances, even though set-point over-shoot has not occurred, the measured water temperature may not fall within the predetermined range (e.g. the measured water temperature may be less than an acceptable temperature). In this instance, the first predetermined temperature value (or set-point temperature) may be upwardly adjusted as shown at 508. In some instances, the adjustment of the first predetermined temperature value (or set-point temperature) may be performed incrementally to help prevent set-point over-shoot, either during a single heating cycle or multiple heating cycles. Once the set-point temperature has been adjusted, the water heater may resume normal operation as shown at 510.

If the measured water temperature exceeds the first predetermined temperature value (or set-point temperature), the controller may determine if the amount of over-shoot exceeds a predetermined overshoot threshold above the first predetermined temperature value (or set-point temperature), as shown at 512. If the amount of over-shoot does not exceed the predetermined overshoot threshold, normal system operation 510 may continue. If the amount of over-shoot does exceed a predetermined overshoot threshold, the first predetermined temperature value (or set-point temperature) may be reduced as shown at 514 to help prevent over-shoot of the original set-point temperature during a subsequent heating cycle. In some cases, this may help reduce potential damage to the tank caused by excessive heat. Once the first predetermined temperature value (or set-point temperature) has been adjusted, the water heater system may resume normal operation 510. It is contemplated that the first predetermined temperature value (or set-point temperature) may be incrementally adjusted by a predetermined amount, but this is not required. In some instances, the first predetermined temperature value (or set-point temperature) may be adjusted during a single heating cycle. In other instances, the first predetermined temperature value (or set-point temperature) may be adjusted incrementally over a number of heating cycles. In some instances, the controller may continue to move up and/or down the first predetermined temperature value (or set-point temperature) in order to maintain the water temperature within a predetermined range around the pre-selected user set-point during subsequent heating cycles.

When set-point over-shoot exceeds a predetermined overshoot threshold, an error message or alert may be generated 516 and transmitted or otherwise made available to the user. The alert may be of any form desired, such as, but not limited to, an audible alarm, a visual alarm, an message displayed on a display, a blinking light, an electronic message, an email, a text message, etc. The alert may be transmitted in such a way that the user is made aware of the sediment build-up. In some cases, the error message may provide the user with instructions on how to remove the sediment build-up from the water storage tank.

Once sediment build up conditions have been detected, the controller may operate the water heater so as to help compensate for the sediment build up. In some instances, the water heater burner element (such as, but not limited to, gas burner 24) may be cycled for short durations in order to allow heat built up in the sediment to be released. Operating the burner element in such a manner may improve the operational efficiency of the water heater and may reduce stress on the heat exchanger metal. For example, in some instances, once sediment build up has been detected, the burner element may be turned off prior to reaching the predetermined temperature value (or set-point temperature). The burner element may remain off for a predetermined length of the time in order to allow heat trapped or contained within the sediment to be released. The burner element may be activated after the predetermined length of time to continue heating the water within the water storage tank. The burner may remain activated for a predetermined length of time after which the burner element is again turned off. The burner element may be cycled on and off for predetermined time intervals until the predetermined temperature value (or set-point temperature) is reached.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A control unit for controlling a tank-style water heater, the tank style water heater including a water storage tank, a temperature sensor for sensing a temperature of water in the water storage tank, and a heating element for heating water in the water storage tank, the control unit comprising:
   A controller coupled to the temperature sensor and the heating element, wherein the controller:
   Monitors the temperature of the water within the water storage tank over time via the temperature sensor, resulting in a temperature profile;
   Activates the heating element when the temperature of the water in the water storage tank reaches a second predetermined temperature value, and deactivates the heating element when the temperature of the water in the water storage tank reaches a first predetermined temperature value defining a heating cycle; and
   Determines if the temperature profile includes one or more features that indicate a sediment build up in the water storage tank, wherein the one or more features that indicate a sediment build up in the water storage tank include one or more of:
   A temperature overshoot by at least an overshoot threshold amount over the second predetermined temperature value after the heating element is deactivated;
   A transient temperature spike that has a magnitude that is greater than a threshold magnitude, occurring while the heating element is activated;
   A transient temperature spike that has a magnitude that is greater than a threshold magnitude, occurring after the heating element is deactivated;
   A change in a heating rate of the water within the water storage tank by more than a threshold amount relative to an expected heating rate for a clean water storage tank;
   Wherein if it is determined that the temperature profile includes one or more features that indicate a sediment build up in the water storage tank, the controller;
   Activates the heating element when the temperature of the water in the water storage tank reaches the second predetermined temperature value, and deactivates the heating element before the temperature of the water in the water storage tank reaches the first predetermined temperature value; and
   Cycles the heating element by activating and deactivating the heating element with a reduced heating cycle time until the temperature of the water in the water storage tank reaches the first predetermined temperature value.

2. The control unit of claim 1, wherein the controller is configured to determine if the temperature profile includes one or more features that indicate a sediment build up in the water storage tank by:
   comparing a measure related to the first predetermined temperature value with the temperature of the water in the water storage tank a predetermined interval after the heating element is deactivated by the controller.

3. The control unit of claim 2, wherein the controller determines that the temperature profile does include one or more features that indicate a sediment build up in the water storage tank when the measure related to the first predetermined temperature value is at or above the temperature of the water in the water storage tank at the predetermined interval after the heating element is deactivated by the controller.

4. A method for operating a tank-style water heater having a water storage tank with a controller, the controller coupled to a temperature sensor and a heating element of the tank-style water heater, the method comprising:
   Activating the heating element of the water heater when the temperature of the water in the water storage tank reaches a second predetermined temperature value, and deactivating the heating element when the temperature of the water in the water storage tank reaches a first predetermined temperature value defining a heating cycle;
   Measuring a temperature of water within the water storage tank over time with the temperature sensor;
   Monitoring the measured temperature of water within the water storage tank over time resulting in a monitored temperature profile;
   Determining if the monitored temperature profile includes one or more features that indicate a sediment build up in the water storage tank, and if so, providing an output that indicates sediment build up is present, wherein the one or more features that indicate a sediment build up in the water storage tank include one or more of:

A temperature overshoot by at least an overshoot threshold amount of the first predetermined temperature value after the heating element is deactivated;

A transient temperature spike that has a magnitude that is greater than a threshold magnitude, occurring while the heating element is activated;

A transient temperature spike that has a magnitude that is greater than a threshold magnitude, occurring after the heating element is deactivated;

A change in a heating rate of the water within the water storage tank by more than a threshold amount relative to an expected heating rate for a clean water storage tank;

if it is determined that the monitored temperature profile includes one or more features that indicate a sediment build up in the water storage tank, then When the temperature of the water in the water storage tank reaches the second predetermined temperature value, cycling the heating element by activating and deactivating the heating element two or more times with a reduced heating cycle time until the temperature of the water in the water storage tank reaches the first predetermined temperature value.

5. The method of claim 4, wherein the output includes providing a visual indication to a user.

6. The method of claim 4, wherein the output includes providing an audible indication to a user.

7. The method of claim 4, wherein if it is determined that the temperature profile includes one or more features that indicate a sediment build up in the water storage tank, the method further includes reducing the second predetermined temperature value.

8. A method for operating a tak-style water heater having a water storage tank and a heating element with a controller, the controller coupled to a temperature sensor and the heating element of the tank-style water heater, the method comprising:

Monitoring a temperature of water within the water storage tank at intervals over time, resulting in a monitored temperature profile;

Activating the heating element of the water heater when the temperature of the water in the water storage tank reaches a second predetermined temperature value, and deactivating the heating element when the temperature of the water in the water storage tank reaches a first predetermined temperature value defining a heating cycle; and Determining if the monitored temperature profile deviates from an expected temperature profile for a clean water storage tank and includes one or more features that indicate a sediment build up in the water storage tank, and if so, Activating the heating element when the temperature of the water in the water storage tank reaches the second predetermined temperature value, and deactivating the heating element before the temperature of the water in the water storage tank reaches the first predetermined temperature value; and After the heating element is deactivated before the temperature of the water in the water storage tank reaches the first predetermined temperature value, Cycling the heating element by activating and deactivating the heating element with a reduced heating cycle time until the temperature of the water in the water storage tank reaches the first predetermined temperature value.

9. The method of claim 8 further comprising:
providing an output that indicates sediment build up is present if it is determined that the monitored temperature profile includes one or more features that indicate a sediment build up in the water storage tank.

10. The method of claim 8, wherein the one or more features include a temperature overshoot feature that represents a temperature overshoot by at least an overshoot threshold amount over the first predetermined temperature value after the heating element is deactivated.

11. The method of claim 8, wherein the one or more features include a transient temperature spike that has a magnitude that is greater than a threshold magnitude, occurring while the heating element is activated or after the heating element is deactivated.

12. A control unit for controlling a tank-style water heater, the tank style water heating including a water storage tank, a temperature sensor for sending a temperature of water in the water storage tank, and a heating element for heating water in the water storage tank, the control unit comprising:

A controller coupled to the temperature sensor and the heating element, the controller configured to:

Monitor the temperature of the water within the water storage tank via the temperature sensor;

Activate the heating element when the temperature of the water in the water storage tank reaches a second predetermined temperature value, and deactivating the heating element when the temperature of the water in the water storage tank reaches a first predetermined temperature value defining a heating cycle; and Determine if sediment build up in the water storage tank is present by detecting one or more of:

A temperature overshoot by at least an overshoot threshold amount of the first predetermined temperature value after the heating element is deactivated;

A transient temperature spike that has a magnitude that is greater than a threshold magnitude, occurring while the heating element is activated;

A transient temperature spike that has a magnitude that is greater than a threshold magnitude, occurring after the heating element is deactivated;

A change in a heating rate of the water within the water storage tank by more than a threshold amount relative to an expected heating rate for a clean water storage tank;

Wherein if it is determined that sediment build up in the water storage tank is present the controller is configured to:

Activate the heating element when the temperature of the water in the water storage tank reaches the second predetermined temperature value, and deactivate the heating element before the temperature of the water in the water storage tank reaches the first predetermined temperature value; and After the heating element is deactivated before the temperature of the water in the water storage tank reaches the first predetermined value, activating and deactivating the heating element one or more times with a reduced heating cycle time until the temperature of the water in the water storage tank reaches the first predetermined temperature value.

* * * * *